United States Patent [19]

Stavenau et al.

[11] 4,134,474
[45] Jan. 16, 1979

[54] OBSERVATION STAND

[75] Inventors: Harold L. Stavenau; Reuben W. Kaplan, both of Owatonna, Minn.

[73] Assignee: Truth Incorporated, Owatonna, Minn.

[21] Appl. No.: 873,791

[22] Filed: Jan. 31, 1978

[51] Int. Cl.² .......................... A47C 9/10; A45F 3/26
[52] U.S. Cl. ................................. 182/187; 182/163; 182/116
[58] Field of Search ............... 182/187, 188, 116, 163, 182/164

[56] References Cited

U.S. PATENT DOCUMENTS

| 3,065,821 | 11/1962 | Hundley | 182/187 |
|---|---|---|---|
| 3,817,350 | 6/1974 | Gray | 182/187 |
| 3,961,686 | 6/1976 | Starkey | 182/187 |
| 3,990,536 | 11/1976 | Wilburn | 182/187 |
| 4,022,292 | 5/1977 | Von Gompel | 182/187 |

*Primary Examiner*—Reinaldo P. Machado
*Attorney, Agent, or Firm*—Wegner, Stellman, McCord, Wiles & Wood

[57] ABSTRACT

A portable observation stand for mounting on trees having a wide range of diameters. The stand includes a frame, which is detachably secured to a selected tree, and an articulated ladder which may be retained in a climbing position, for entry by an outdoorsman, and in a base position to provide support for a floor during use. A U-shaped rail may be mounted on the frame, and a shroud which encloses the stand may be secured to the rail.

12 Claims, 5 Drawing Figures

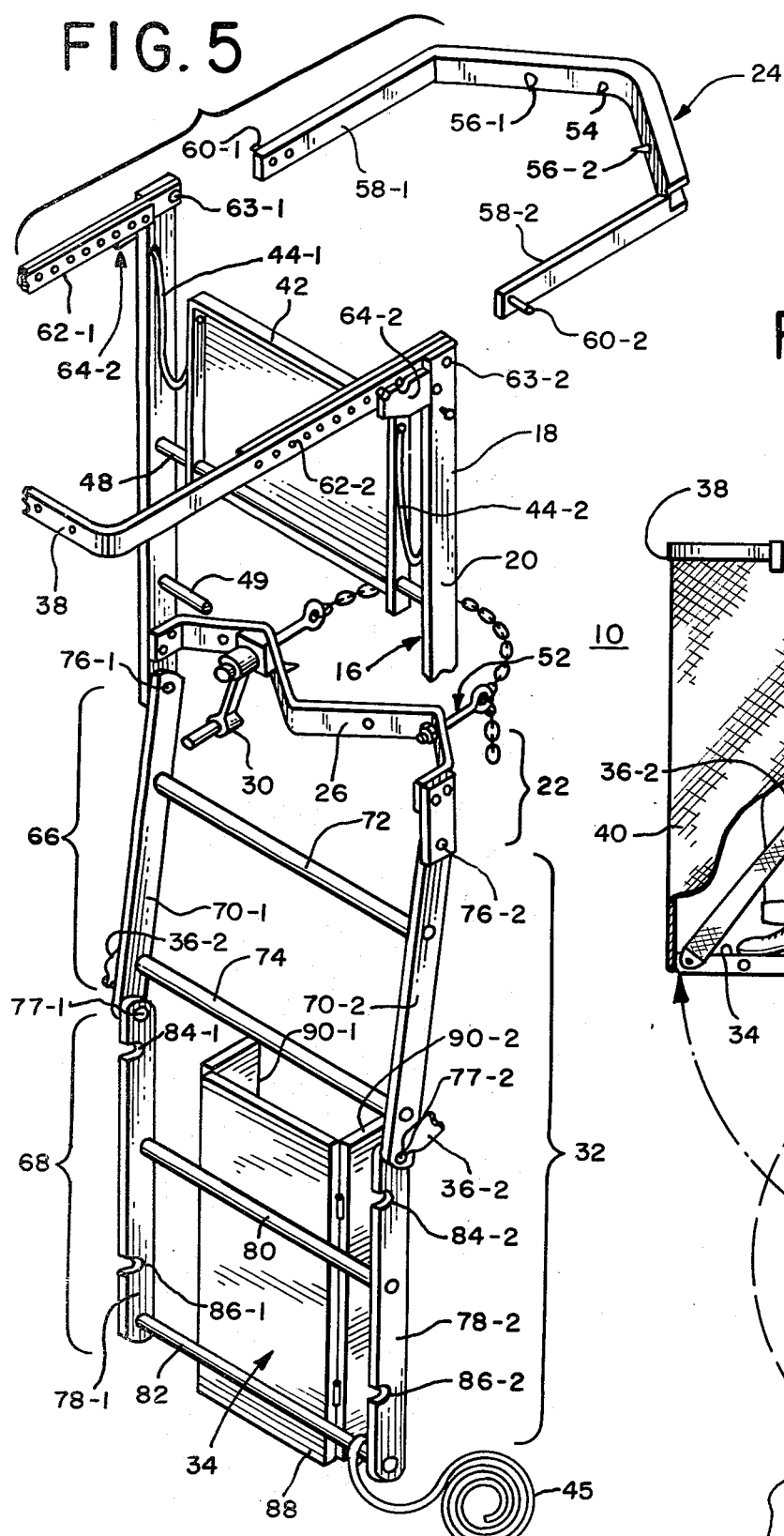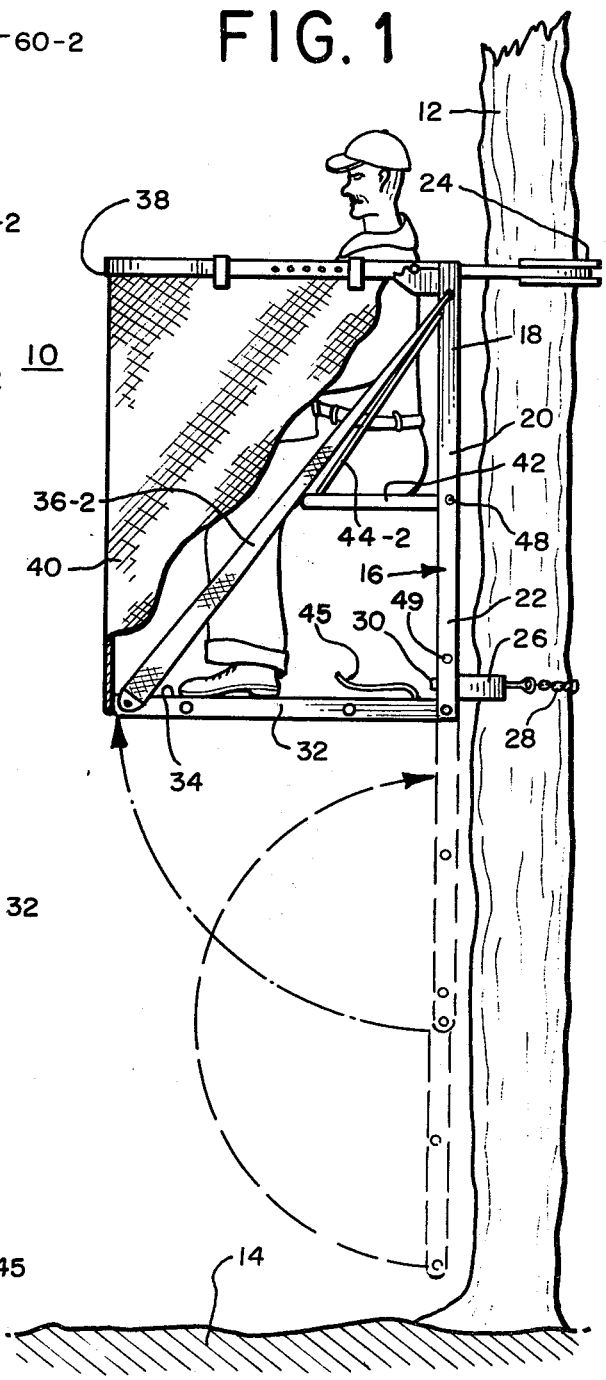

OBSERVATION STAND

BACKGROUND OF THE INVENTION

This invention relates to collapsible and portable protective enclosure and, more particularly, to a tree stand adapted to be mounted and removed from a tree or pole.

During wildlife observation or hunting, it is often desirable to be located above the ground. A variety of portable tree stands have been developed which permit the outdoorsman to first mount the tree stand on a selected tree and then remove it at the conclusion of his observation. Many tree stands cause significant damage to the tree. Others are not portable and capable of being easily moved from tree to tree. Yet other tree stands are not capable of accommodating trees having a wide range of tree diameters.

SUMMARY OF THE INVENTION

In accordance with the present invention, a portable and collapsible tree stand includes a frame, a mounting structure for securing the frame to a tree, a seat and a base. The tree stand may be detachably secured to a selected tree by the outdoorsman who enters the stand by a ladder which he then folds to provide the base which supports a floor. A rail supports a shroud which may be used for enclosing the stand. The mounting structure for securing the frame to the tree includes an adjustable band having tree-engaging studs which retain the stand vertically during use. A flexible member, such as a chain, girdles the tree to retain the stand in its position. An operator-adjustable crank draws the flexible member into engagement with the tree to assure a secure engagement of the tree-engaging studs with the tree.

It is a feature of the invention to provide a portable stand having a mounting structure which securely, yet detachably, mounts on a selected tree.

Another feature of the invention is to provide a tree stand having an articulated ladder which folds to provide a base which supports a floor.

Yet another feature of the invention is to provide a lightweight tree stand which may be mounted on trees having a wide range of diamaters.

Another feature of the invention is to provide a foldable, lightweight stand which may be transported by the outdoorsman as a backpack and quickly mounted on a selected tree.

BRIEF DESCRIPTION OF THE DRAWING

FIG. 1 is a side view of the tree stand of the present invention with part of the shroud broken away;

FIG. 5 is another perspective view of the tree stand of FIGS. 1 and 2 in a position in which an observer climbs into the tree stand.

DESCRIPTION OF PREFERRED EMBODIMENT

Figure 2:
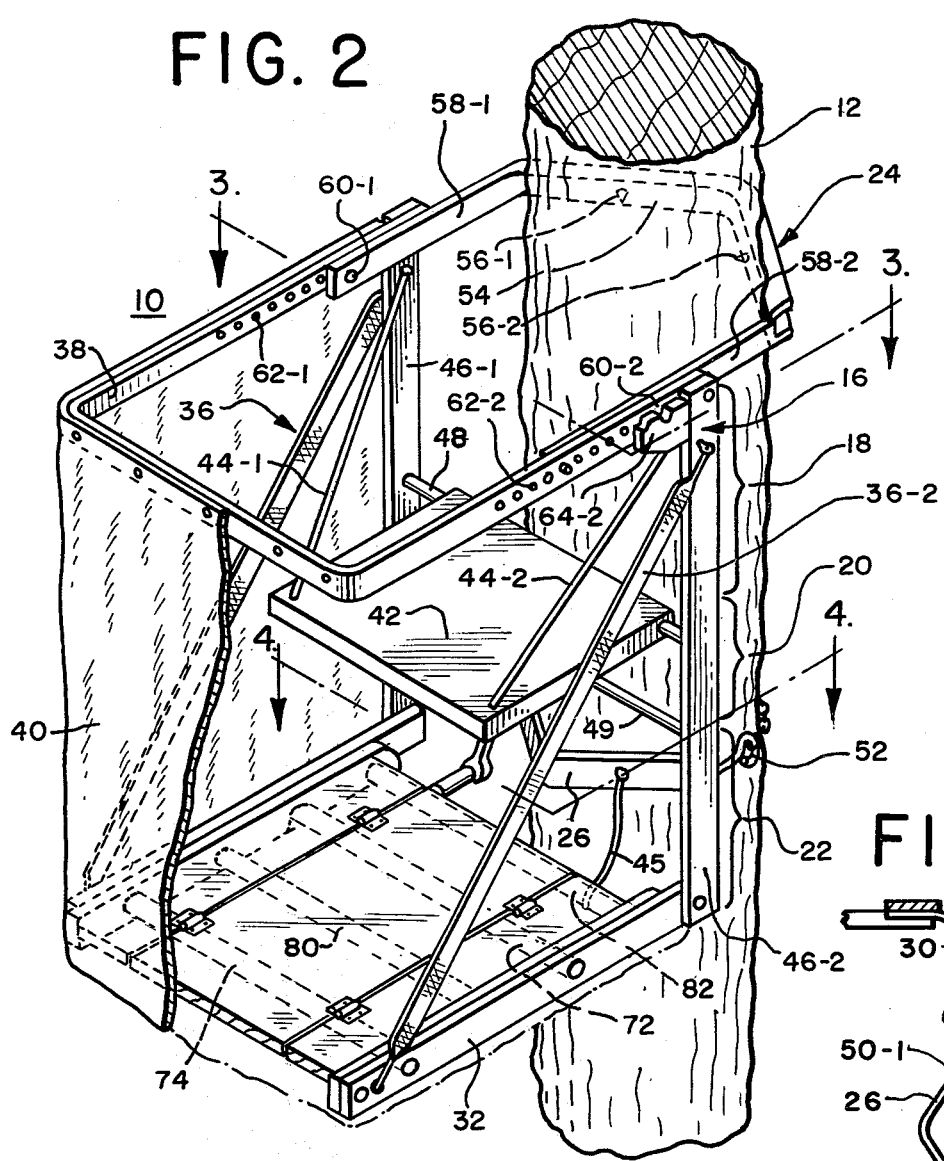
FIG. 2 is a prespective view of the tree stand shown in FIG. 1 with part of the shroud broken away.

Referring to FIG. 1, a portable and collapsible tree stand 10 is shown to be secured to a tree 12 usually six to eight feet above the ground 14. The tree stand 10 includes a main support frame 16 having an upper section 18, a middle section 20 and a lower section 22. A detachable upper band 24 encircles the tree 12 to retain stand 10 in a selected vertical position, as will be discussed in greater detail below.

A V-shaped bracket 26 is secured to lower section 22, which opens outwardly from the rear side of the frame, and a flexible member 28, as a chain, encircles the tree, forming a girdle about the tree to assure tight relationship with it. The flexible member 28 is tightened by a crank 30. An articulated ladder 32 is pivotably attached to lower section 22 of main support frame 16. The ladder 32 is movable between a base position, as shown in FIG. 1, or a climbing position, as shown in FIG. 5, in which the observer enters the tree stand. A floor 34 of sectional construction is supported by articulated ladder 32 and provides a platform on which the outdoorsman may stand. Articulated ladder 32 is held in its base position by straps 36-1 and 36-2 which are secured to the upper section 18 of main support frame 16. A U-shaped rail 38 may be secured to the upper section 18 of main support frame 16 for the mounting of a shroud 40 which may be fastened thereto by suitable fasteners (not shown) such as Velcro. The shroud 40 may also extend across the U-shaped rail 38 behind a seat 42 to fully surround the outdoorsman. A seat 42 may be pivotably attached to middle section 20 of main support frame 16 and held in place by straps 44-1 and 44-2. A cord 45 is attached to the lowest rung of articulated ladder 32 to accommodate changing from the base position to the operator's climbing position.

Figure 4:
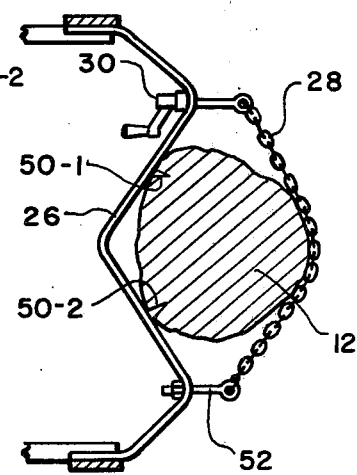
FIG. 4 is another cross-sectional view taken through the lines 4—4 of FIG. 2.
Figure 3:
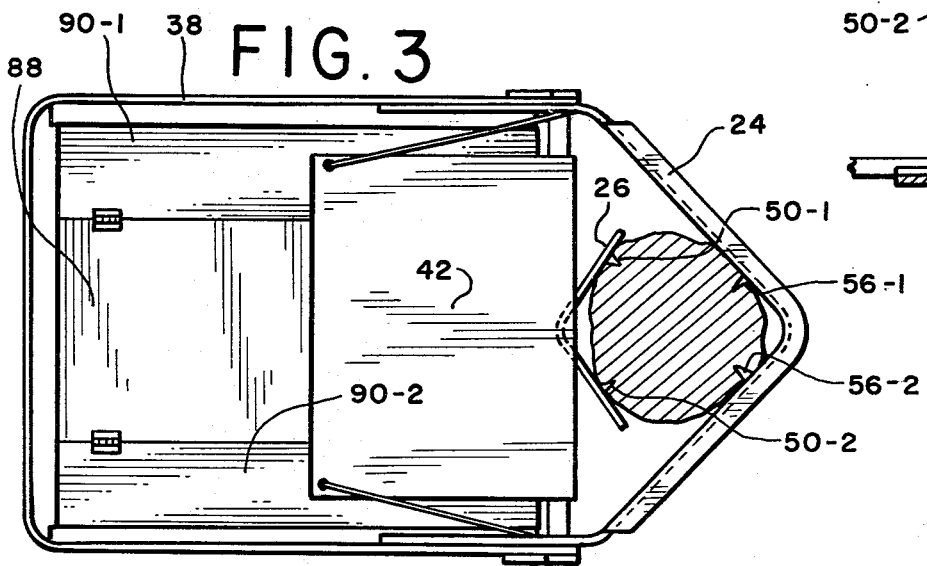
FIG. 3 is a cross-sectional view taken through the lines 3—3 of FIG. 2.

Referring to FIGS. 2-5, the construction of the tree stand 10 will now be described. The main support frame 16 includes two horizontally spaced-apart vertical supports 46-1 and 46-2. The vertical supports 46 are spaced apart by any selected distance of sufficient width to accommodate an adult. Two vertically spaced horizontal bars 48 and 49 secure support 46-1 to support 46-2 at the middle section 20 and the lower section 22, respectively, of the main support frame 16. Seat 42 may be pivotably mounted on bar 48. Horizontal bar 49 may be used as a rung by the outdoorsman when changing from the operator climbing position to the base position. The outwardly opening V-shaped bracket 26 is also secured to supports 46-1 and 46-2 at the lower section 22 of main support frame 16 and may be provided with tree-engaging studs or spikes 50-1 and 50-2.

Crank 30 is mounted on the V-shaped brackets 26 and controls the tension of flexible member 28, the other end of which is secured to a chain hook 52 mounted on V-shaped bracket 26. The rotation of crank 30 causes flexible member 28 to tighten and draws the engaging spikes 50-1 and 50-2 into engagement with the tree.

Detachable upper band 24 includes a V-shaped section 54 having tree-engaging studs or spikes 56-1 and 56-2. The V-shaped section 54 extends outwardly, forming legs 58-1 and 58-2. Legs 58 are provided with outwardly projecting pins 60-1 and 60-2. The pins 60 in legs 58 are received by any one of the adjustment holes 62-1 and 62-2 in U-shaped rail 38. The legs 58 and the adjustment holes 62 permit the adjustment of the position of the upper band 24 with respect to main support frame 16 to accommodate a wide range of tree diameters.

The U-shaped rail 38 is mounted for rotation about frame 16 at upper section 18 by pins 63-1 and 63-2. Brackets 64-1 and 64-2, which are rigidly secured to the U-shaped rail 38, abut supports 46-1 and 46-2 to retain U-shaped rail 38 in a generally horizontal position.

Articulated ladder 32 includes an upper section 66 and a lower section 68. Upper section 66 includes two horizontally spaced-apart supports 70-1 and 70-2, which are secured to the ends of rungs 72 and 74. Upper section 66 is mounted for pivotal movement about lower section 22 of main support frame 16 at pins 76-1 and 76-2.

Lower section 68 of articulated ladder 32 includes two horizontally spaced-apart supports 78-1 and 78-2 which are secured to the ends of rungs 80 and 82. The lower section 68 is mounted for rotation about the lower end of upper section 66 at pins 77. Supports 78 are provided with outwardly opening U-shaped grooves 84 and 86 to accommodate the rungs 72 and 74 when the stand is in its base position.

Floor 34, which is secured to rungs 80 and 82, includes a center section 88 and side sections 90-1 and 90-2, which are hinged about center section 88.

The operation of the tree stand will now be provided with reference to FIG. 5. The outdoorsman removes the collapsible tree stand from his backpack and lays it on the ground and detaches band 24 from frame 16. The tree stand is then placed next to a selected tree and pins 60 are inserted through one of the set of holes 62 of U-shaped rail 38 so that the detachable upper band 24 encircles the tree 12. The operator then lifts the entire stand to the desired height on the tree and secures flexible member 28 to hook 52. Then the operator rotates crank 30, causing the tree-engaging spikes 50-1 and 50-2 to penetrate the tree. The outdoorsman then climbs up the articulated ladder 32, traversing first ladder lower section 68 and then ladder upper section 66. When the outdoorsman reaches the lower rung 49 of the frame middle section 20, he pulls cord 45 to cause the ladder lower section 68 to rotate through approximately 180° and thereby be generally coincident with ladder upper section 66. The cord 45 is of sufficient length to extend from the ladder rung 82 to the hand of the outdoorsman while he is standing on the rung 49. The outdoorsman then pulls on either strap 36-1 or strap 36-2 to pull articulated ladder 32 (which is now folded) to a generally horizontal position. He then secures straps 36 to main support frame 16. The U-shaped rail 38, which will normally be in the lower position prior to securing the observation stand to the tree, provides a means for containing the outdoorsman during final mounting of the stand.

During transport of the stand, articulated ladder 32 is folded toward main support frame 16. U-shaped rail 38 and upper band 24 are folded parallel with main frame 16. The outdoorsman may strap the stand to his back, or may carry it as one would carry a stepladder.

We claim:
1. A stand for mounting on a tree comprising:
a frame having a front side, a rear side, an upper section, a middle section and a lower section;
mounting structure for securing the frame to a tree, said mounting structure extending outwardly from the rear side of the frame;
an articulated ladder pivotably secured to the lower section of the frame, said ladder mounted for rotation between a climbing position extending vertically and downwardly from the frame, and a base-extending position extending horizontally and outwardly from the front side of the frame; and
means for retaining the articulated ladder in the base-extending position.

2. The tree stand of claim 1 wherein the mounting structure includes:
an upper band detachably secured to the upper end of the frame and adapted to encircle a tree;
a V-shaped bracket secured to the lower section of the frame, opening outwardly from the rear side;
a flexible member detachably secured to said lower section of the frame forming a girdle about the tree with the second V-shaped bracket; and
means for drawing the flexible member into tight relationship with the tree.

3. The tree stand of claim 1 wherein ther rigid band and the lower V-shaped bracket include tree-engaging studs.

4. The tree stand of claim 1 wherein the articulated ladder includes:
an upper section having an upper and a lower end formed by two horizontally spaced-apart supports secured together by a plurality of vertically spaced-apart rungs;
a lower section having an upper and a lower end formed by two horizontally spaced-apart supports secured together by a plurality of vertically spaced-apart rungs;
pins connecting the lower end of the upper section for rotation about the upper end of the lower section; and
a floor secured to said lower section.

5. The tree stand of claim 4 wherein the floor is of sectional construction.

6. The tree stand of claim 1 further including:
a seat pivotably secured to the middle section of the frame.

7. The tree stand of claim 1 further including:
a U-shaped rail secured to the upper section of the frame and extending from the front side thereof.

8. The tree stand of claim 7 wherein a shroud is mounted on the rail.

9. The tree stand of claim 1 further including:
means for moving said articulated ladder between the vertically extending position and the base position.

10. The tree stand of claim 1 wherein the retaining means is two spaced-apart straps secured to the upper section of the frame and to the base.

11. The tree stand of claim 1 wherein said mounting structure includes:
vertically spaced-apart and opposing tree-engaging studs positioned so that said studs engage the tree as a result of the weight of an outdoorsman in the stand when said stand is in its base position.

12. A stand for mounting on a tree comprising:
a frame having a front side, a rear side, an upper section, a middle section and a lower section;
mounting structure for securing the frame to a tree including
an upper band detachably secured to the upper end of the frame and adapted to encircle a tree, said upper band having tree-engaging studs; and
a V-shaped bracket secured to the lower section of the frame, opening outwardly from the rear side, said V-shaped bracket having tree-engaging studs;
an articulated ladder pivotably secured to the lower section of the frame, said ladder mounted for rotation between a climbing position extending vertically and downwardly from the frame and a base position extending horizontally and outwardly from the front side of the frame, said articulated ladder including an upper section having an upper end and a lower end formed by two horizontally spaced-apart support secured together by a plurality of vertically spaced rungs, a lower section having an upper and a lower end formed by two horizontally spaced-apart supports secured together by a plurality of vertically spaced-apart rungs, pins connecting the lower end of the upper section for rotation about the upper end of said lower section, and a floor secured to said lower section; and means for retaining the articulated ladder in the base position.

* * * * *